V. R. O'BRIEN AND W. N. PARKS.
NIPPLE COUPLING FOR RADIATORS AND SIMILAR STRUCTURES.
APPLICATION FILED JAN. 9, 1918.
1,340,289.
Patented May 18, 1920.
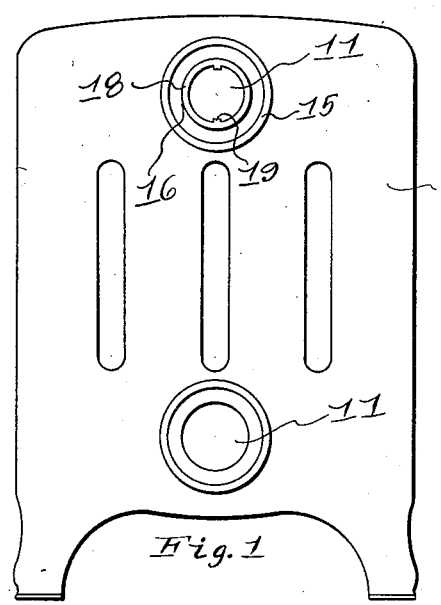
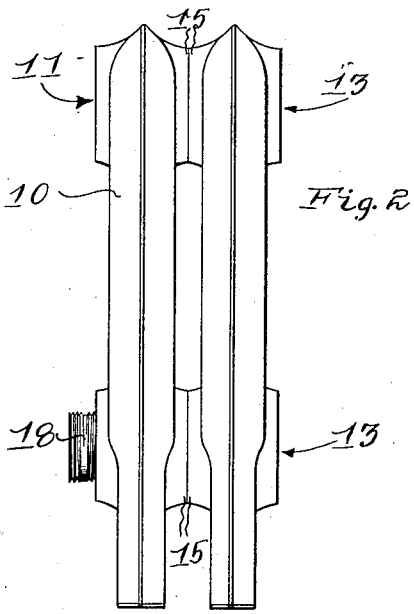
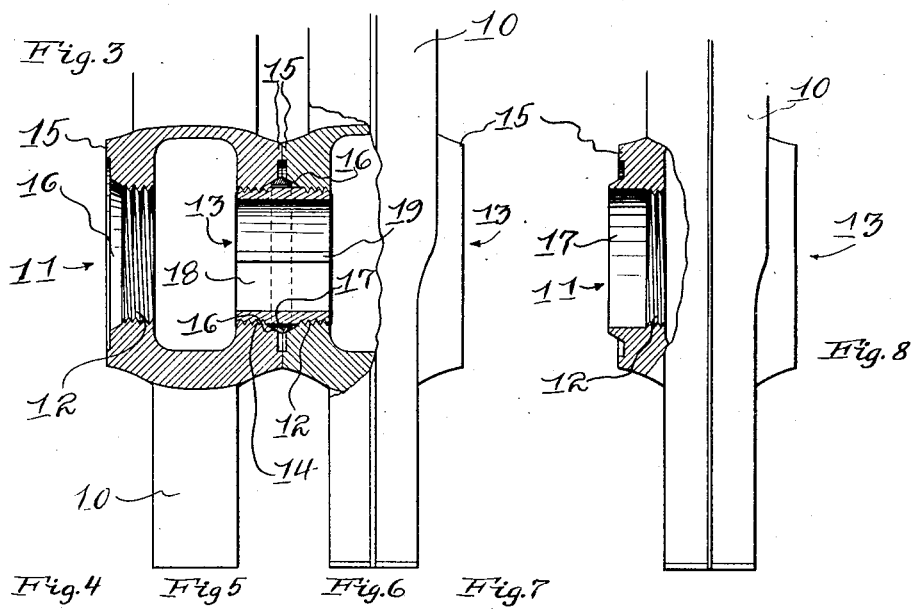
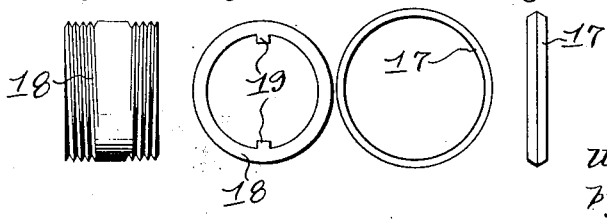
Inventors
Vincent R. O'Brien
William N. Parks
by John E. Stryker Atty.

UNITED STATES PATENT OFFICE.

VINCENT R. O'BRIEN AND WILLIAM N. PARKS, OF ST. PAUL, MINNESOTA.

NIPPLE-COUPLING FOR RADIATORS AND SIMILAR STRUCTURES.

1,340,289.

Specification of Letters Patent.

Patented May 18, 1920.

Application filed January 9, 1918. Serial No. 210,991.

*To all whom it may concern:*

Be it known that we, VINCENT R. O'BRIEN and WILLIAM N. PARKS, citizens of the United States, residing at St. Paul, in the county of Ramsey and State of Minnesota, have invented new and useful Improvements in Nipple-Couplings for Radiators and Similar Structures, of which the following is a specification.

Its object is to provide an economical and simple leak-proof coupling for use in assembling radiator sections and the like.

A further object is to dispense with gaskets, packing and tie-rods in radiators.

These and other objects will more fully hereinafter appear in the specification and claims.

In the accompanying drawings, Figure 1 is a front elevation of a common radiator section, showing the circulating passageways therein; Fig. 2 is a side elevation of two such sections coupled together; Fig. 3 is an enlarged detail section of the coupling uniting the sections shown in Fig. 2; Fig. 4 is a side view of the threaded nipple employed in our coupling; Fig. 5 is an end view thereof; Fig. 6 is an end view of our preferred form of slip nipple; Fig. 7 is a side view thereof; and Fig. 8 is a fragmentary sectional view of a modified form of our construction.

Referring to the drawings, we have used the reference numeral 10 to indicate a section or unit commonly used in building up radiators for heating plants; such section having top and bottom passageways upon each side to permit circulation of steam or water therethrough. The passageways 11 on one side are formed with right-hand threads 12 at their inner ends, while the passageways 13 on the opposite side are provided with similarly located left-hand threads 14. An annular flange 15 surrounds the outer end of each passageway 11 and 13, and presents a symmetrical bearing surface for a like flange on the adjacent section (Fig. 2).

We form an internal annular bevel 16 in the outer ends of the passageways 11 and 13. An annular metal ring or slip nipple 17, whose radial cross-section is an obtuse triangle (adapted to fit laterally in adjacent grooves 16), is placed upon a right and left threaded nipple 18, having a pair of longitudinal, diametrically-opposite ribs 19 on its inner periphery; said threaded nipple being adapted to be screwed simultaneously into the passageways 11 and 13 of two adjacent sections 10 by means of a suitable tool (not shown) passing through a section and engaging the ribs 19. The flange 15 of the sections are thereby drawn together and as they abut (Fig. 3), the slip nipple 17 slides into the beveled annular grooves between the flanges and is clamped with its beveled sides seated against correspondingly beveled surfaces 16 of the said sections, thus securing a steam and water-tight connection between the two sections. We prefer to make the central portion of the periphery of the threaded nipple (which carries the slip nipple) smooth and of a diameter to fit the inside of the slip nipple.

A modification of our construction is illustrated in Fig. 8, and in this embodiment, the slip nipple 17, instead of being loosely placed about the threaded nipple 18, is integral with one section 10 of the radiator. The beveled contact of this form of construction with a companion section is essentially the same as in our preferred construction, the threaded nipple 18, of course, sliding through said modified form of nipple 17 as in our preferred embodiment.

Having described our invention, what we claim as new and desire to protect by Letters Patent, is:

1. The combination with a plurality of radiator sections or the like, each having a passageway alined with a corresponding passageway of an adjacent section, of threads in said passageways and beveled seats at the outer ends thereof, a threaded nipple adapted to be screwed into two adjoining passageways simultaneously, a slip nipple slidable on said threaded nipple and adapted to be clamped against said beveled seats when said threaded nipple is screwed into said passageways.

2. The combination with a pair of radiator sections or the like having passageways therein, of annular flanges surrounding the outer ends of said passageways, annular beveled grooves formed in the outer ends of said passageways, internal threads formed in the walls of said passageways, an annular slip nipple having beveled ends adapted to be seated in the beveled grooves in said passageways, a threaded nipple slidable through said slip nipple and adapted to be screwed into said passageways to draw said flange into close contact and tightly seat said slip nipple in the adjacent grooves.

3. In a plurality of radiator sections having alined passageways, means to unite said passageways, comprising internal threads in said passageways, an annular beveled seat at the outer ends of said passageways, a slip nipple adapted to fit said beveled seats, and a threaded nipple provided with internal tool engaging ribs and adapted to be screwed into said passageways to clamp the beveled seats thereof against said slip nipple.

4. A coupling for uniting a pair of radiator sections, comprising a right and left threaded nipple, a slip nipple, whose radial cross section is an obtuse triangle, slidable upon said threaded nipple, said threaded nipple being adapted to be screwed into said sections to draw the same into contact and said slip nipple being adapted to be hermetically seated against the abutting surfaces of said sections.

5. The combination with a plurality of radiator sections, each having a passageway alined with a corresponding passageway of an adjacent section, of threads in said passageways and beveled grooves at the outer ends thereof, a threaded nipple adapted to be screwed into adjacent passageways simultaneously, means within said nipple to turn the same, a slip nipple slidable on said threaded nipple and adapted to be clamped in said grooves when said threaded nipple is screwed into said passageways.

Whereof we have hereunto subscribed our names to this specification.

VINCENT R. O'BRIEN.
WILLIAM N. PARKS.